Patented Aug. 28, 1951

2,566,272

UNITED STATES PATENT OFFICE 2,566,272

WAX, POLYMERIC KETONE, AND AMINE COMPOSITIONS

James H. Werntz, Wilmington, Del., assignor to E. I. du Pont de Nemours & Company, Wilmington, Del., a corporation of Delaware No Drawing. Application March 25, 1949, Serial No. 83,523

16 Claims. (Cl. 260—28.5)

This invention relates to new compositions of matter and to methods for their preparation. More particularly this invention relates to water-repellent compositions and to articles and substrates containing such compositions.

This application is a continuation-in-part of my application Serial No. 26,245, filed May 10, 1948, now Patent No. 2,495,283, issued January 24, 1950.

This invention has as an object to provide new compositions having water-repellent properties and to provide methods for their preparation. A further object is to provide articles and substrates containing coatings of these new water-repellent compositions. A still further object is to provide textile materials having water-repellent coatings. Other objects will appear hereinafter.

These objects are accomplished by providing new compositions comprising a water-repellent wax, a polymeric ketone and an amine having at least one hydrogen atom attached to amino nitrogen, that is a primary or secondary amine. The preferred new compositions comprise a water-repellent wax, an ethylene/carbon monoxide polyketone, and a polymeric polyprimary amine. Articles and substrates treated with the composition comprising water-repellent wax, polymeric ketone and primary or secondary amine are provided with a coating which insolubilizes to a water-repellent finish. These polymeric ketones are also referred to herein as polymeric polyketones, the prefix "poly" in polyketone indicating that the polymer contains many keto groups.

The usual way for preparing the compositions of this invention is to dissolve the amine either in an organic solvent or in a dilute aqueous solution of a volatile acid in amount sufficient to give a 0.1 to 30% solution by weight. A wax having water-repellent properties and a monoolefin/carbon monoxide polyketone are then added in amounts sufficient to provide a wax plus monoolefin/carbon monoxide polyketone to primary or secondary amine weight ratio of from 1:5 to 1200:1 and preferably from 2:1 to 10:1, and this blend is homogenized by stirring and heating. The resulting composition is then reduced with organic solvent or water to provide a blend containing from 0.5 to 20% and preferably from 2 to 8%, of wax plus monoolefin/carbon monoxide polyketone.

The examples which follow are submitted to illustrate and not to limit this invention. Parts are by weight, unless otherwise stated.

*Example I*

A solution was prepared by dissolving in 93 parts of warm benzene, 4 parts of paraffin wax, 2 parts of an ethylene/carbon monoxide polyketone containing 70.82% carbon and 9.63% hydrogen, which corresponds to an ethylene:carbon monoxide mole ratio of 1.92:1, and a molecular weight of 2048, and 1 part of a polymeric polyamine derived from a 3-pentenenitrile polymer, prepared as described below. Cotton sateen was impregnated with this solution by dipping, and the treated sateen was squeezed by passing it through a wringer roll with the pressure adjusted so that the total pick-up of solution was equal to the dry weight of the fabric. The impregnated fabric was allowed to air-dry and was then heated for 5 minutes at 175° C. The initial spray rating of the fabric was 100 and after three launderings it was 70+. When the ethylene/carbon monoxide polyketone was excluded from the composition the washfastness was much poorer.

The water-repellency values referred to above and in the subsequent examples were determined by the method described in the Year Book of the American Association of Textile Chemists and Colorists 23, 240–4 (1946).

The laundry tests mentioned above and in the subsequent examples were carried out as follows: The fabric was washed for 40 minutes at a starting temperature of 100° C. in a mechanical laundering machine having a reversible cycle, using a washing solution containing 36 parts of soap, 18 parts of sodium carbonate, and 18,000 parts of water and maintaining a total load of 1000 parts. After each laundering the fabric was rinsed in distilled water and after the first and third launderings it was squeezed, allowed to air-dry, and then heated for the time and temperature specified, after which spray ratings were determined.

The polyamine used in the above example was prepared as follows:

3-pentenenitrile was heated with sodium methoxide, the fraction having a moleculer weight of 306 was separated, and then hydrogenated at 250° C. under 1000 atmospheres hydrogen pressure over a nickel-on-kieselguhr catalyst in the presence of ammonia. The reduced product was a brown, viscous liquid having a neutral equivalent of 168 and analyzing 9.75% total nitrogen and 3% primary amino nitrogen.

*Example II*

A solution was prepared by dissolving 2 parts of a polyamine obtained, as described hereinafter, by the reduction of a butadiene/acrylonitrile polymer, 4 parts of molten paraffin wax and 1 part of an ethyl/carbon monoxide polyketone in 93 parts of warm benzene. Cotton sateen was treated with this solution as described in Example I, except that the curing of the fabric was for 10 minutes at 135° C. The initial spray rating of the treated fabric was 100 and after three launderings it was 90. When the ethylene/carbon monoxide polyketone was excluded from the composition, the initial spray rating of the treated fabric was 100 and after three launderings it was 70+.

The ethylene/carbon monoxide polyketone used in the above example had an ethylene:carbon monoxide mole ratio of 7.8:1 and a molecular weight of 1425.

The polyamine used in the above example was prepared as follows:

A pressure reactor was charged with 250 parts of benzene, 53 parts of acrylonitrile, and 6 parts of alpha, alpha'-azodiisobutyronitrile. The vessel was cooled in a carbon dioxide-acetone bath, air was evacuated from the vessel and 270 parts of 1,3-butadiene was distilled into it. The vessel was closed, heated to 80° C. in 83 minutes, and maintained at 80° C. ±3° C. for 16 hours. The vessel was allowed to cool, discharged, and unreacted monomers and solvent removed by distillation. There were recovered 179 parts of a yellow, viscous oil, analyzing 5.84% nitrogen and of molecular weight 910.

Forty parts of the above polymer, 160 parts of cyclohexane, 40 parts of liquid ammonia, and 16 parts of a cobalt-on-alumina catalyst were placed in a pressure reactor, and heated at 300° C. under 4000 pounds/in.$^2$ hydrogen pressure for 4 hours. The reactor was discharged, the reaction mixture filtered to remove the catalyst, and the filtrate subjected to vacuum distillation to remove the solvent. There were recovered 20 parts of a dark red, fluid, product containing 1.91% primary amino nitrogen, and having an iodine number of 165 and a molecular weight of 1057.

Example III

A solution was prepared by dissolving 4 parts of paraffin wax, 2 parts of an ethylene/carbon monoxide polyketone containing an ethylene:carbon monoxide mole ratio of 4.66:1 and of molecular weight 1313, and 1 part of hexamethylene diamine in 93 parts of warm benzene. Cotton sateen was impregnated with this solution as described in Example I and the treated fabric cured by heating for 10 minutes at 135° C. The initial spray rating of the fabric was 100 and after three launderings it was 80+. When the ethylene/carbon monoxide polyketone was excluded from the composition the washfastness was very poor.

Example IV

An aqueous dispersion was made using 4 parts of paraffin wax, 93 parts of water, 1 part of an ethylene/carbon monoxide polyketone, and 2 parts of a polymeric polyamine of neutral equivalent 441, molecular weight 1200, and analyzing 3.6% total nitrogen and 2.52% primary amino nitrogen, prepared by reductively aminating an ethylene:carbon monoxide polyketone having an ethylene:carbon monoxide mole ratio of 8.4:1. The ethylene/carbon monoxide polyketone component of the composition contained an ethylene/carbon monoxide ratio of 7.8:1 and had a molecular weight of 1425.

The wax dispersion was made by dissolving the polyamine in dilute acetic acid by heating to 70° C., while agitating with a high speed mixer. The molten paraffin wax and ethylene/carbon monoxide polyketone were stirred into the polyamine solution at 70° C. by means of the high speed mixer. Water at 70° C., sufficient to make a dispersion containing 20% wax solids, was added, while continuing to stir. After cooling, the concentrated dispersion was diluted with water to a wax content of 4%, which was then used to impregnate undyed cotton sateen fabrics by the procedure described in Example I. The treated fabrics spray-rated 100 after curing 5 minutes at 135° C. After three standard launderings the fabrics were dried 5 minutes at 135° C. and spray-rated 90+. When the ethylene/carbon monoxide polyketone was omitted from the composition, the treated fabrics, after curing for 5 minutes at 175° C., had an initial spray-rating of 100 and of 70 after three standard launderings.

Example V

Undyed sateen fabrics were treated as described in Example I with an impregnating bath prepared as described in Example I. The bath contained 4 parts of paraffin wax, 2 parts of an ethylene/carbon monoxide polyketone, 1 part of 1,2-ethanediamine, and 93 parts of benzene. The ethylene/carbon monoxide polyketone had a molecular weight of 1313 and an ethylene-carbon monoxide mole ratio of 4.66:1. The treated fabrics had an initial spray-rating of 80+ after curing 10 minutes at 135° C. After laundering three times and drying 10 minutes at 135° C. the fabrics spray-rated 70+.

Example VI

Undyed sateen fabrics were treated, as described in Example I, with a bath prepared as described in Example I. The bath contained 4 parts paraffin wax, 2 parts of the ethylene/carbon monoxide polyketone of Example V, 1 part of a polybutadiene diamine, prepared as described hereinafter, and 93 parts of benzene. The treated fabrics spray-rated 90+ after curing 5 minutes at 170° C. After three standard launderings and drying 5 minutes at 175° C. the fabric spray-rated 90.

The polybutadiene diamine used in the above example was prepared as follows:

One hundred twenty parts of $\alpha, \alpha'$ azodiisobutyronitrile and 400 parts of butadiene were heated for 15 hours at 75° C. in a stainless steel pressure reactor. Thereafter the product was transferred to a still and steam-distilled to remove low molecular weight materials, dimers and unconverted monomer. After steam distillation an oil remained in the still. This oil was separated from water and heated under vacuum at 100° C. for 30 minutes to dry it. There were thus obtained 232 parts of a slightly yellow, viscous oil.

Fifty parts of the above oil were dissolved in 100 parts of cyclohexane and placed in a pressure reactor, along with 4 parts of a palladium-on-charcoal catalyst, 15 parts of a nickel-on-kieselguhr catalyst and 52 parts of anhydrous liquid ammonia. The reactor was then pressured with hydrogen to 400 atmospheres and heated for 4 hours at 120° C. Thereafter the pressure was raised 950 atmospheres with hydrogen and the reaction mixture heated at 250° C. for 10 hours. The product was then discharged from the reaction vessel and filtered to remove the catalyst. The filtrate was vacuum distilled at 50° to 60° C. to remove the solvent. There were thus recovered 32 parts of a cloudy, colorless, oil soluble in acetic acid but insoluble in water. This oil had a molecular weight of 439 and analyzed 78.86% carbon, 14.11% hydrogen, and 6.67% nitrogen.

*Example VII*

White sateen fabrics were treated as described in Example I with a bath prepared as described in Example I. The impregnating solution contained 4 parts paraffin wax, 1 part di-(p-aminocyclohexyl)methane, 2 parts of the ethylene/carmon monoxide polyketone of Example V, and 93 parts of benzene. After curing 5 minutes at 175° C. the treated fabric spray-rated 90+. After laundering three times and drying 5 minutes at 175° C. the fabric spray-rated 80+.

*Example VIII*

Undyed sateen fabrics were treated as described in Example I with a bath prepared as described in Example I. The treating bath contained 4 parts of paraffin wax, 1 part 1,4-butanediamine, 2 parts of the ethylene/carbon monoxide polyketone of Example V, and 93 parts of benzene. The treated fabric spray-rated 90+ after curing 10 minutes at 120° C. After laundering three times and drying 10 minutes at 120° C. the fabric spray-rated 70+.

*Example IX*

A treating bath was prepared as described in Example I and contained 4 parts paraffin wax, 2 parts of the ethylene/carbon monoxide polyketone of Example V, 1 part of dodecylamine, and 93 parts of benzene. White sateen fabrics were treated with this bath as described in Example I. The treated fabrics, after curing 5 minutes at 175° C., had a spray-rating of 100. After laundering three times and drying 5 minutes at 175° C. the fabric spray-rated 70+.

*Example X*

A treating bath was prepared as described in Example I and contained 4 parts of paraffin wax, 2 parts of the ethylene/carbon monoxide polyketone of Example V, 1 part of m-phenylenediamine, and 93 parts of benzene. Undyed sateen fabrics were impregnated as described in Example I and spray-rated 100 after curing 5 minutes at 175° C. After laundering three times and drying 5 minutes at 175° C. the fabric spray-rated 80+.

*Example XI*

White sateen fabrics were treated as described in Example I with an aqueous dispersion containing 2 parts of an ethylene/carbon monoxide polyketone, 2 parts paraffin wax, 0.2 part polyvinyl alcohol, 0.02 part of a fatty alcohol sulfate, 2 parts of an acetate salt of a polymeric polyamine derived from an ethylene/carbon monoxide polyketone, and 93.78 parts of water. The dispersion was prepared as follows: 60 parts of paraffin wax and 60 parts of an ethylene/carbon monoxide polyketone were melted together. The ethylene/carbon monoxide ratio in the polyketone was 7.8:1 and the molecular weight was above 500. The solution of the polyketone in the wax was accomplished by stirring with a Waring Blender. Six parts of solid polyvinyl alcohol and 0.6 part of fatty alcohol sulfate were added to the hot melt and stirred for 5 minutes. One hundred thirty-five parts of boiling water were added next to the hot melt, at such a rate that the bath inverted from a water-in-oil to an oil-in-water emulsion. Forty-five additional parts of hot water were added. The bath temperature was 92° C. One hundred fifty parts of ice were added next with rapid agitation provided by the Waring Blender until all the ice had dissolved and the temperature had dropped to 38° C. This provided a concentrated dispersion containing the following proportion of components: ethylene/carbon monoxide polyketone:paraffin wax:polyvinyl alcohol:fatty alcohol sulfate:water=14:14:1.4:0.14:70.46. A solution of 2 parts of the polymeric polyamine in 2 parts of acetic acid was added to 14.2 parts of the concentrated dispersion which was then diluted with water to provide an impregnating bath containing 2% paraffin wax.

Fabrics treated with the above bath spray-rated 100 after curing 10 minutes at 135° C. After laundering three times and drying 10 minutes at 135° C. the fabrics spray-rated 80+.

The polymeric polyamine used in the above composition was made by the reductive amination of an ethylene/carbon monoxide polyketone having an ethylene/carbon monoxide mole ratio of 10.9:1. The polyamine had a molecular weight of 1650, a neutral equivalent of 515, contained 3.11% total nitrogen, and 1.92% primary amino nitrogen.

*Example XII*

Undyed sateen fabrics were treated as described in Example I with an aqueous dispersion containing 2 parts of an ethylene/carbon monoxide polyketone, 2 parts of paraffin wax, 0.4 part of polyvinyl alcohol, 0.04 part fatty alcohol sulfate, 2 parts of 1,2-ethanediamine, and 93.56 parts of water. The ethylene/carbon monoxide polyketone was blended with the paraffin wax and emulsified as described in Example XI. The concentrated dispersion contained 14.5 parts of ethylene/carbon monoxide polyketone, 14.5 parts of paraffin wax, 2.9 parts of polyvinyl alcohol, 0.29 part of a fatty alcohol sulfate, and 67.81 parts of water. The impregnating bath was made by adding to 20.7 parts of the concentrated dispersion 4.5 parts of an aqueous solution containing 68% of 1,2-ethanediamine and diluting with water to 150 parts.

Fabrics impregnated with the above bath were cured 5 minutes at 175° C. and had a spray rating of 100. After laundering three times and drying 5 minutes at 175° C. the fabrics spray-rated 70.

The ethylene/carbon monoxide polyketone used in the above composition had an ethylene/carbon monoxide ratio of 9.3:1 and a molecular weight above 600.

The monomeric amines used in the process of this invention contain at least one primary or secondary amine group, boil above about 90° C., and may be aromatic, alicyclic, or acyclic. Examples of such amines are 1,4-diaminobenzene, 1,1'-diaminodiphenyl, bis(4-aminophenyl)methane, bis(4-aminophenyl)butane, 1,4-diaminotoluene, 1,4-diaminocyclohexane, bis(4-aminocyclohexyl)methane, bis(4-aminocyclohexyl)hexane, 2-ethylhexylamine, n-octylamine, diisobutylamine, didodecylamine, dicyclohexylamine, dipentylamine, diphenylamine, and the like.

The polymeric polyamines may contain the primary or secondary amino nitrogens attached directly to the main polymer chain, as in the products obtained by the reductive amination of monoolefin/carbon monoxide polyketones as described in the copending application of H. H. Hoehn, Serial No. 4,932, filed January 28, 1948, now U. S. Patent 2,495,255, or they may contain the primary or secondary amino groups attached to the main polymer chain through hydrocarbon radicals which are lateral substituents on the main polymer chain.

The polymeric polyamines obtained by the reductive amination of monoolefin/carbon monoxide polyketones have a main carbon chain and amino-nitrogen groups attached directly by a single bond to a carbon atom which is an integral part of the main polymer chain, the remaining valences of the nitrogen in the amino-nitrogen group being satisfied by at least one hydrogen atom. The second type of polymeric polyamine have a main polymer chain consisting solely of carbon atoms and primary amino groups attached thereto through a hydrocarbon radical of from 1 to 7 carbon atoms. Examples of polymeric polyamines of this kind are the products obtained by reducing poly(3-pentenenitrile), the reduction product from poly(nitrostyrene), the reduction product of nitrated butadiene/styrene copolymers, the reductive amination products from vinyl ketone polymers, copolymers of vinyl ketones with polymerizable vinylidene compounds, reduction products of polyacrylonitrile and of poly(alkacrylonitriles), the reduction products of copolymers of acrylonitrile and alkacrylonitriles with polymerizable vinylidene compounds, i. e., polymerizable compounds containing a double bonded methylene group, as disclosed and claimed in the copending application of Paul S. Pinkney, Serial No. 51,845, filed September 29, 1948, now abandoned, of which Serial No. 108,043, filed August 1, 1949 is a continuation-in-part. Examples of such polymerizable vinylidene compounds are ethylene, propylene, butylenes, 2-chloro-1,3-butadiene, isoprene, 1,3-butadiene, piperylene, styrene, methyl vinyl ketone, vinyl acetate, vinyl chloride, vinyl trimethyl acetate, vinyl fluoride, methyl and ethyl acrylates and methacrylates, vinylidene chloride, vinyl cyclohexene, vinyl naphthalene, etc.

In the polyamines described in the aforementioned application of Paul S. Pinkney the primary amino group is attached to the main polymer chain through a methylene group. These polymeric polyprimary amines are linear polymers characterized by a plurality of units of the formula

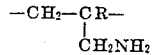

wherein R is hydrogen or an alkyl group of one to six carbons. This unit may be the sole unit in the polymer but is usually associated with unreduced acrylonitrile or alkacrylonitrile units,

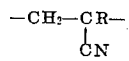

and may also include the polymeric units of any polymerizable vinylidene compound copolymerized with the acrylonitrile or alkacrylonitrile. The radical R in the foregoing formulas is preferably hydrogen or methyl, since acrylonitrile and methacrylonitrile are readily available.

The preferred products are polymeric polyamines derived from copolymers of acrylonitrile or alkacrylonitriles with vinylidene hydrocarbons and particularly the copolymers with 1,3-diene hydrocarbons, e. g., 1,3-butadiene.

In the case of the acrylonitrile and alkacrylonitrile copolymers it is generally desirable that the products hydrogenated contain at least one nitrile group for each 50 carbon atoms of the polymeric chain. Because hydrogenation of the nitrile groups to aminomethyl groups is usually incomplete it is desirable that the starting polymers contain at least one nitrile group for each 6 carbon atoms of the linear polymer chain and that the hydrogenation be continued until the resulting polymeric polyamine contains at least one amino group for each 10 carbon atoms in the polymer.

The monoolefin/carbon monoxide polyketones employed in the practice of this invention are the products prepared as described in the copending application of M. M. Brubaker, Serial No. 552,374, filed September 1, 1944, now abandoned, of which Patent No. 2,495,286, issued January 24, 1950 is a continuation-in-part, and that of P. S. Pinkney, Serial No. 28,365, filed May 21, 1948. These polyketones are made by polymerizing carbon monoxide with a monoolefin containing from 2 to 4 carbon atoms, e. g., ethylene, propylene, and the butylenes. If desired there may be used a mixture of monoolefins or monoolefins admixed with other polymerizable vinylidene compounds. The polyketone polymers may be used in amounts of from 10 to 250 parts and preferably of from 40 to 200 parts for each 100 parts of the amine in the composition. The monoolefin/carbon monoxide polymers having a ratio of at least 1.9:1 and a molecular weight of at least 500 are particularly useful because they produce compositions which impart to substrates water-repellency and washfastness at a lower curing temperature than do compositions comprising only the polymeric polyprimary amine and wax. Examples of other polyketone polymers are copolymers of butadiene with methylvinyl ketone and polymers of methyl vinyl ketone.

Although in the examples, the monomeric and polymeric amine has been added to a dilute aqueous solution of an acid and the mixture stirred until it was dissolved, a preformed salt of the monomeric and polymeric amine with an organic or inorganic acid can be used and simply added to water or to an organic solvent. Suitable acids for the preparation of solutions of the amines, or salts thereof, are acetic, formic, tartaric, citric, propionic, isobutyric, succinic, maleic, malic, and the like, adipic, sebaic, lactic, benzoic, carbonic, and the like. Boric, sulfuric, phosphoric, and aryl sulfonic acids may also be employed in preparing salts of the polymeric polyamines as can also halogen acids such as hydrochloric and hydrobromic. Salts of readily volatile acids are preferred. In applications involving cellulosic materials, however, the use of strong acids is to be avoided because of the tendering effect which the acid has on the cellulose.

As the wax component of the compositions of this invention there can be used an synthetic or naturally occurring wax. Examples of suitable waxes are paraffin wax, microcrystalline hydrocarbon waxes, polyethylenes of the type disclosed and claimed in U. S. Patent No. 2,153,553, hydrocarbon waxes obtained by hydrogenation of carbon monoxide, montan wax, carnauba wax, beeswax, polycarboxylic acid-polyhydric alcohol-long chain fatty acid polyesters, formaldehyde condensation products of amides of saturated fatty acids containing from 12 to 18 carbon atoms, e. g., methylenedistearamide, methylolstearamide, ethylenedistearamide, methylenedipalmitamide, methylenedilauramide, methylenedipentadecanamide, methylenediarachylamide and the like, stearone, dicetyl carbonate, octadecylcycloethyleneurea, dioctadecylurea, thio-bis-stearamide, dioctadecylamine, poly(n-butyl methacrylate), octadecylstearate, and the like. For use in rendering textiles water-repellent, it is preferred that the wax component of the compositions be one containing 25 or more carbon atoms.

To the blends of wax, amine, and polyketone there may be added ancillary materials, such as aldehydes, e. g., formaldehyde, paraformaldehyde, glyoxal, etc., alone or in conjunction with an acid reacting material, e. g., ammonium bisulfate, ammonium chloride, camphorsulfonic acid ammonium salt, etc.

Since the polymeric polyamines, in the form of their salts with volatile organic acids, have dispersing properties it is not necessary to employ other deflocculating agents in the preparation of dispersions in aqueous systems. This property is of a transitory nature and hence it is lost upon decomposition of the salt. This is a valuable characteristic because it makes it possible to prepare dispersions without having the deflocculating agent contribute water-sensitivity to the resulting dry film. The polymeric polyamine salts which have been decomposed, as by heat-treatment, are not dispersible in dilute aqueous acid solutions.

Compositions having valuable water-repellency characteristics may be made by deflocculating a wax, e. g., methylolstearamide with polyvinyl alcohol and then diluting the resulting dispersion with a solution of the polymeric polyamine. Such compositions especially when they contain an ethylene/carbon monoxide polyketone and a small amount of hydroxycarboxylic acid, such as, tartaric acid or an acid reacting material such as camphorsulfonic acid ammonium salt, impart to textiles superior water-repellency and permanence to laundering and dry-cleaning.

The compositions of this invention are useful for the coating and impregnation of all sorts of substrates. They are particularly useful for imparting water-repellency to rigid and non-rigid bibulous substrates and especially to textile materials. The application to the substrate may be carried out by brushing, dipping or spraying, or by a combination of these methods. After application excess solution is removed, if necessary, and the treated article is heated to between 90° and 180° C., preferably to between 90° and 140° C., for from 5 to 30 minutes to bring about insolubilization of the coating. If desired, the polymeric polyamine may be applied to the substrate either from a dispersion in water or from solution in an organic medium and then to the treated substrate there is applied the wax admixed with an ethylene/carbon monoxide polymer, from solution in an organic solvent, or from an aqueous dispersion. On subjecting the treated article to heat treatment, the polyamine, wax, and ethylene/carbon monoxide polymer fuse and blend together, providing the surface with a water-repellent coating. In another modification the polyamine, wax and ethylene/carbon monoxide polymer blend may be heated together to form a homogeneous blend, which is particularly useful for the coating of paper.

Suitable substrates for the application of the compositions of this invention are films, fibers, yarns, fabrics and other articles made from filaments, fibers or yarns derived from natural, modified natural or synthetic polymeric materials or from blends of these. Specific examples are paper, cotton, silk, regenerated cellulose, nylon, polyacrylonitrile, polyethylenes of the type disclosed and claimed in U. S. Patent No. 2,153,553, leather, hemp, sisal, coconut, etc., films, fabrics and fibers derived from casein, soya protein, peanut protein, gelatin, hydrolyzed ethylene/vinyl acetate polymers, polyvinyl alcohol, vinyl acetate/vinyl chloride polymers, and the like, fiber-forming linear polyesters, asbestos, cellulose esters and ethers, e. g. cellulose nitrate, cellulose acetate, ethyl cellulose, etc., porous tile, wood, cork, etc. Dyed and undyed cotton sateen, poplin, broadcloth, jean cloth, gabardine, etc., are especially adaptable for treatment with the compositions of this invention to produce products possessing not only excellent water-repellency but which are also permanent to dry-cleaning and laundering. The compositions of this invention may also be applied to non-porous substrates, e. g. glass, metals, ceramics, etc.

The compositions of this invention per se or with added materials such as pigments, dyes, anti-oxidants, fillers, oils, natural and synthetic resins, asphalts, deflocculating agents, fire-retardants, fungicides, insecticides and the like are useful for the treatment of such fabricated articles as fabrics, paper, paper cartons, marine ropes, fishing leaders, etc., to impart water-repellency and thus enhance their fields of utility and life.

As many apparently widely different embodiments of this invention may be made without departing from the spirit and scope thereof, it is to be understood that this invention is not limited to the specific embodiments thereof except as defined in the appended claims.

I claim:

1. A composition comprising a water-repellent wax, an amine having a skeleton consisting solely of carbon atoms to which is attached acyclic amino nitrogen having at least one hydrogen atom attached thereto, and a polymeric ketone selected from the class consisting of poly (methyl vinyl ketone), copolymers of methyl vinyl ketone with butadiene, and polymers of carbon monoxide with a monoolefin containing from 2 to 4 carbon atoms, the ration by weight of wax plus polymeric ketone to amine being from 1:5 to 1200:1, and the polymeric ketone being in amount from 10 to 250 per cent by weight of the amine.

2. A composition comprising a water-repellent wax, an amine having a skeleton consisting soley of carbon atoms to which is attached acyclic amino nitrogen having at least one hydrogen atom attached thereto, and a polymeric ketone consisting of a polymer of carbon monoxide with a monoolefin containing from 2 to 4 carbon atoms, the ratio by weight of wax plus polymeric ketone to amine being from 1:5 to 1200:1, and the polymeric ketone being in amount from 10 to 250 per cent by weight of the amine.

3. A composition comprising a water-repellent wax, an amine having a skeleton consisting solely of carbon atoms to which is attached acyclic amino nitrogen having at least one hydrogen atoms attached thereto, and a polymeric ketone consisting of a polymer of carbon monoxide with ethylene, the ratio by weight of wax plus polymeric ketone to amine being from 1:5 to 1200:1, and the polymeric ketone being in amount from 10 to 250 per cent by weight of the amine.

4. A composition comprising a water-repellent wax, a polymeric polyamine containing a main polymer chain consisting solely of carbon atoms and having amino groups each attached directly by a single bond to a carbon atom which is an integral part of the main polymer chain, the remaining valences of the nitrogen in the amino-nitrogen groups being satisfied by at least one hydrogen atom, and a polymeric ketone consisting of a polymer of carbon monoxide with a monoolefin containing from 2 to 4 carbon atoms, the ration by weight of wax plus polymeric ketone to amine being from 1:5 to 1200:1, and the polymeric ketone being in amount from 10 to 250 per cent by weight of the amine.

5. A composition comprising a water-repellent wax, a polymeric polyamine containing a main polymer chain consisting solely of carbon atoms and having amino groups each attached directly by a single bond to a carbon atom which is an integral part of the main polymer chain, the remaining valences of the nitrogen in the amino-nitrogen groups being satisfied by at least one hydrogen atom, and a polymeric ketone consisting of a polymer of carbon monoxide with ethylene, the ratio by weight of wax plus polymeric ketone to amine being from 1:5 to 1200:1, and the polymeric ketone being in amount from 40 to 200 per cent by weight of the amine.

6. A composition comprising a water-repellent wax, a polymeric polyprimary amine containing a main polymer chain consisting solely of carbon atoms and having primary amino groups each attached to said polymer chain through a hydrocarbon radical of from 1 to 7 carbon atoms, said hydrocarbon radical being a lateral substituent of the main polymer chain, and a polymeric ketone consisting of a polymer of carbon monoxide with a monoolefin containing from 2 to 4 carbon atoms, the ratio by weight of wax plus polymeric ketone to amine being from 1:5 to 1200:1, and the polymeric ketone being in amount from 10 to 250 per cent by weight of the amine.

7. A composition comprising a water-repellent wax, a polymeric polyprimary amine containing a main polymer chain consisting solely of carbon atoms and having primary amino groups each attached to said polymer chain through a hydrocarbon radical of from 1 to 7 carbon atoms, said hydrocarbon radical being a lateral substituent of the main polymer chain, and a polymeric ketone consisting of a polymer of carbon monoxide with ethylene, the ratio by weght of wax plus polymeric ketone to amine being from 1:5 to 1200:1, and the polymeric ketone being in amount from 40 to 200 per cent by weight of the amine.

8. A composition as set forth in claim 2 wherein said amine is a monomeric amine having a skeleton consisting solely of carbon atoms to which is attached acyclic amino nitrogen having at least one hydrogen atom attached thereto.

9. A composition as set forth in claim 5 wherein said polymeric polyamine consists of a reductively aminated polymer of carbon monoxide with ethylene.

10. A composition as set forth in claim 7 wherein said polymeric polyprimary amine consists of the reduction product of a polymer of butadiene with acrylonitrile.

11. A composition as set forth in claim 3 wherein said amine is a monomeric amine.

12. A composition as set forth in claim 11 wherein said monomeric amine is an aromatic amine.

13. A composition as set forth in claim 11 wherein said monomeric amine is an alicyclic amine.

14. A composition as set forth in claim 3 wherein said amine is hexamethylenediamine.

15. A composition as set forth in claim 3 wherein said amine is phenylenediamine.

16. A composition as set forth in claim 3 wherein said amine is di-(p-aminocyclohexyl)methane.

JAMES H. WERNTZ.

REFERENCES CITED

The following references are of record in the file of this patent:

UNITED STATES PATENTS

| Number | Name | Date |
| --- | --- | --- |
| 2,348,039 | Ulrich et al. | May 2, 1944 |
| 2,495,283 | Werntz | Jan. 24, 1950 |
| 2,495,285 | Hoehn | Jan. 24, 1950 |